(12) United States Patent
Yamaguchi et al.

(10) Patent No.: US 12,022,246 B2
(45) Date of Patent: Jun. 25, 2024

(54) OPTICAL SIGNAL PROCESSING APPARATUS

(71) Applicant: Nippon Telegraph and Telephone Corporation, Tokyo (JP)

(72) Inventors: Keita Yamaguchi, Musashino (JP); Kenya Suzuki, Musashino (JP); Takashi Go, Musashino (JP); Osamu Moriwaki, Musashino (JP); Ai Yanagihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 72 days.

(21) Appl. No.: 17/623,672

(22) PCT Filed: Jul. 1, 2019

(86) PCT No.: PCT/JP2019/026137
§ 371 (c)(1),
(2) Date: Dec. 29, 2021

(87) PCT Pub. No.: WO2021/001891
PCT Pub. Date: Jan. 7, 2021

(65) Prior Publication Data
US 2022/0272427 A1 Aug. 25, 2022

(51) Int. Cl.
*H04Q 11/00* (2006.01)
*G02F 1/21* (2006.01)
*G02F 1/225* (2006.01)

(52) U.S. Cl.
CPC ......... *H04Q 11/0005* (2013.01); *G02F 1/212* (2021.01); *G02F 1/225* (2013.01); *H04Q 2011/0058* (2013.01)

(58) Field of Classification Search
CPC ........ H04Q 11/0005; H04Q 2011/0058; G02F 1/212; G02F 1/225
See application file for complete search history.

(56) References Cited

U.S. PATENT DOCUMENTS 6,427,037 B1 * 7/2002 Okayama ........... H04Q 11/0005
385/16

FOREIGN PATENT DOCUMENTS

| JP | 2000-235199 A | | 8/2000 |
| JP | 2003-21815 A | | 1/2003 |
| JP | 2003021815 A | * | 1/2003 |

(Continued)

OTHER PUBLICATIONS

T. Shibata et al., *Silica-Based Waveguide-Type 16×16 Optical Switch Module Incorporating Driving Circuits*, IEEE Photonics Technology Letters, vol. 15, No. 9, pp. 1300-1302, Sep. 2003.

(Continued)

*Primary Examiner* — Pranesh K Barua
(74) *Attorney, Agent, or Firm* — Workman Nydegger

(57) ABSTRACT

In order to reduce the number of power driving elements, an optical signal processing device includes a control unit, a current generation unit, a connection portion, and an optical signal processing unit, the current generation unit includes one or a plurality of power driving elements s, the optical signal processing unit is an optical waveguide on a substrate, and a plurality of driven elements are connected in parallel to an identical one of the plurality of power driving elements and are driven.

15 Claims, 13 Drawing Sheets

(56) References Cited

FOREIGN PATENT DOCUMENTS

| JP | 2005-99522 A |   | 4/2005 |
|----|--------------|---|--------|
| JP | 2005099522 A | * | 4/2005 |
| JP | 2010-79082 A |   | 4/2010 |
| JP | 2010079082 A | * | 4/2010 |
| JP | 2012-22184 A |   | 2/2012 |
| JP | 2012022184 A | * | 2/2012 |

OTHER PUBLICATIONS

Takashi Goh, et al., *Low Loss and High Extinction Ratio Strictly Nonblocking 16×16 Thermooptic Matrix Switch on 6-in Wafer Using Silica-Based Planar Lightwave Circuit Technology*, IEEE J. Lightwave Technol., vol. 19, No. 3, pp. 371-379, 2001.

T. Watanabe, et al., *Silica-based PLC Transponder Aggregateors for Colorless, Directionless, and Contentionless ROADM*, OFC/NFOEC 2012, OTh3D. 1, Mar. 8, 2012, Los Angeles.

Kei Watanabe, et al., *Ultralow Power Consumption Silica-Based PLC-VOA/Switches*, J. Lightwave Technol. 26, 2235-2244 (2008).

* cited by examiner

OPTICAL SIGNAL PROCESSING APPARATUS

TECHNICAL FIELD

The present invention relates to a signal processing device including an optical waveguide and, particularly, to a dynamic optical signal processing device of which a state is variable due to a control signal applied from the outside, and a driving unit therefor.

TECHNICAL FIELD

An optical waveguide is a technology for confining light in a minute region and controlling the light so that functions are expressed, and is used in various optical devices. An optical waveguide is generally realized by any of various dielectrics such as a quartz material, a polymer, and a lithium niobate, or a semiconductor material such as silicon or InP.

Examples of devices that use an optical waveguide technology include devices that use a thermo-optical effect, such as switches and variable attenuators. For example, in the case of an optical switch, it has been reported that a multi-input multi-output switch can be realized by combining Mach-Zehnder interferometers (MZIs) (Non Patent Literature 1) in a row and in parallel (Non Patent Literatures 2 and 3). In this switch, the phase shifter of each MZI is driven so that an output destination of light can be switched. Further, a variable attenuator (Non Patent Literature 4) has also been reported and, for example, a plurality of MZIs and phase shifters can be integrated to obtain an array of variable attenuators.

The device using the above-described optical waveguide is indispensable for a configuration of an optical communication system, and the importance thereof is increasing especially in a recent optical node having a colorless, directionless, contentionless (CDC)-reconfigurable optical add/drop multiplexing (ROADM) function. For example, a multicast switch (MCS) is an indispensable device that realizes CDC-ROADM. In a device such as an MCS, a switch state is changed by a phase shifter using a thermo-optical effect, but when an optical switch scale increases, the number of included phase shifters increases. For example, in a 16×16 MCS, the number of phase shifters is at least 256. In fact, because one switch element includes two MZIs in order to secure an extinction ratio in an OFF state of the optical signal, the number of phase shifters reaches 512.

CITATION LIST

Patent Literature

Non Patent Literature 1: T. Shibata et al., "Silica-Based Waveguide-Type 16×16 Optical Switch Module Incorporating Driving Circuits," in IEEE Photonics Technology Letters, vol. 15, no. 9, pp. 1300-1302, September 2003

Non Patent Literature 2: Takashi Goh, Mitsuho Yasu, Kuninori Hattori, Akira Himeno, Masayuki Okuno, and Yasuji Ohmori, "Low Loss and High Extinction Ratio Strictly Nonblocking 16×16 Thermooptic Matrix Switch on 6-in Wafer Using Silica-Based Planar Lightwave Circuit Technology," IEEE J. Lightwave Technol., vol. 19, no. 3, pp. 371-379, 2001

Non Patent Literature 3: T. Watanabe, et al., "Silica-based PLC Transponder Aggregateors for Colorless, Directionless, and Contentionless ROADM," OFC/NFOEC 2012, OTh3D. 1, Mar. 8, 2012, Los Angeles Non Patent Literature 4: Kei Watanabe, Yasuaki Hashizume, Yusuke Nasu, Masaki Kohtoku, Mikitaka Itoh, and Yasuyuki Inoue, "Ultralow Power Consumption Silica-Based PLC-VOA/Switches," J. Lightwave Technol. 26, 2235-2244 (2008)

SUMMARY OF THE INVENTION

Technical Problem

In the above-described MCS, it is necessary to apply an electrical control signal to a phase shifter of each MZI in order to drive 512 MZIs. Further, in a matrix switch type multi-input multi-output switch (Non Patent Literature 2) or an MCS switch (Non Patent Literature 3), it is necessary to drive the same number of switch elements as the number of inputs or the number of outputs (when two MZIs constitute one switch element, twice the number of MZIs).

In this case, even when circuit elements such as MZIs have the same design, characteristics thereof vary due to a variation in film quality in a wafer or an influence of peripheral optical circuits. As an example, in the MZI, a variation is likely to be caused in optical path length difference between upper and lower arms and a resistance value of a heater. A voltage or current amount of a power supply required for switching an output destination in the MZI changes accordingly, resulting in deterioration of optical characteristics such as an insertion loss.

In order to correct this variation through control, it is necessary to adjust an output voltage or current amount of the power supply prepared individually for each MZI Thus, in a large-scale switch, a control unit that individually controls a power supply and an output value thereof according to the scale of the switch is required. This has a problem in that a cost increases when the scale increases.

Means for Solving the Problem

The present invention has been made in view of such a problem. An object of the present invention is to simplify a control unit of an optical signal processing device by controlling a plurality of driving elements (switch elements) with a power driving unit such as one power supply.

The present invention is characterized in that, as an example, the following configurations are included in order to achieve such an object.

First, in an optical waveguide type optical device including driven elements such as phase shifters, a configuration of an optical signal processing device having a function of connecting a plurality of driven elements in parallel and supplying power using a common power driving unit is provided.

Configuration 1

An optical signal processing device including: a control unit, a current generation unit, a connection portion, and an optical signal processing unit, in which the current generation unit includes one or a plurality of power driving elements, the optical signal processing unit includes an optical waveguide on a substrate, and a plurality of driven elements are connected in parallel to an identical one of the one or plurality of power driving elements and are driven.

Configuration 2

The optical signal processing device according to configuration 1, in which the control unit includes electrical switches configured to switch whether or not corresponding ones of the driven elements are connected to a corresponding one of the plurality of power driving elements.

Configuration 3

The optical signal processing device according to configuration 1 or 2, in which the optical signal processing unit includes MZIs, the driven elements are heaters disposed in the MZIs, and widths or lengths of the heaters differ in a chip of the optical waveguide.

Configuration 4

The optical signal processing device according to configuration 3, in which some of the MZIs constituting the optical signal processing unit are controlled in a push-pull driven manner.

Configuration 5

The optical signal processing device according to any one of configurations 1 to 4, in which the optical signal processing unit is a multi-input multi-output optical switch or a multicast switch (MCS).

Configuration 6

The optical signal processing device according to any one of configurations 1 to 5, in which the one or plurality of power driving elements are each a constant current source, and the number of driven elements driven simultaneously is constant.

Configuration 7

The optical signal processing device according to configuration 6, further including: another driven element that does not contribute to optical signal processing.

Configuration 8

The optical signal processing device according to any one of configurations 5 to 7, in which the optical signal processing unit is an M-input N-output MCS configured to split each of M inputs into N outputs, a plurality of the power driving elements are included in the current generation unit, and, among the plurality of driven elements, driven elements for switching of an identical output port are connected in parallel to an identical one of the plurality of power driving elements and shared.

Configuration 9

The optical signal processing device according to any one of configurations 5 to 8, in which the optical signal processing unit includes a plurality of multi-input multi-output optical switches or MCSs and an N×1 optical switch (N is an integer), and the multi-input multi-output optical switches or MCSs and the N×1 optical switch are connected to separate ones of the plurality of power driving elements.

Configuration 10

The optical signal processing device according to any one of configurations 1 to 9, in which a variable resistor is connected in series or in parallel to the plurality of driven elements connected in parallel.

Effects of the Invention

According to the present invention, it is possible to reduce the number of power driving units such as power supplies by sharing the power driving units among a plurality of phase shifters in an optical signal processing device such as an optical switch or an optical filter realized by using an optical waveguide. Because of the effect, mass productivity of the optical signal processing devices is improved, and contribution to a low cost of the devices is achieved through reduction of the number of parts.

DESCRIPTION OF EMBODIMENTS

Embodiment 1

Figure 1:
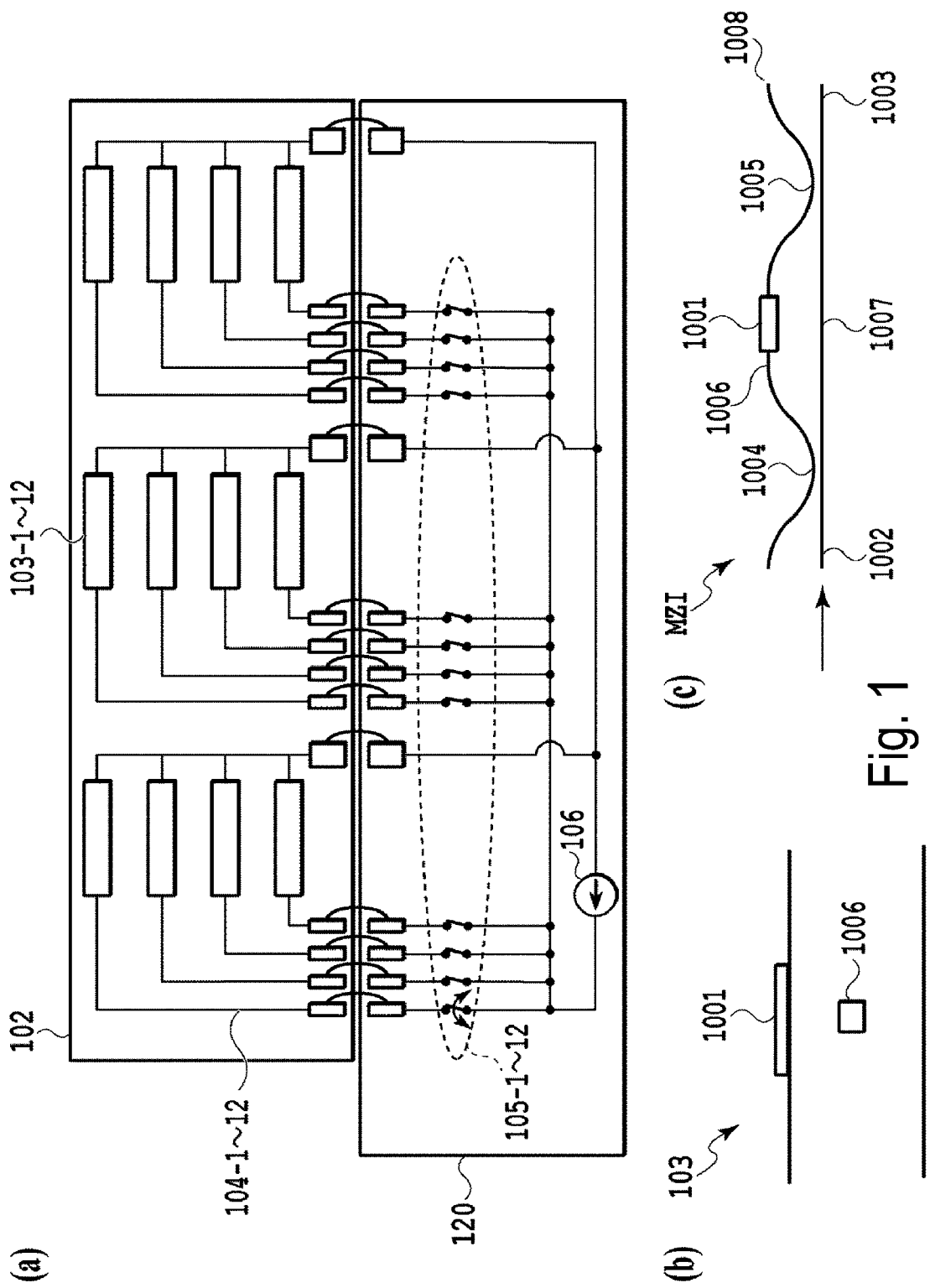
FIG. 1 is a diagram illustrating a configuration of an optical signal processing device according to Embodiment 1 of the present invention.

FIG. 1(a) illustrates a configuration of an optical signal processing device according to Embodiment 1 of the present invention. As illustrated in a top view of FIG. 1(a), the optical signal processing device of Embodiment 1 includes a control unit 120 for electrical control and an optical waveguide chip 102 (an optical signal processing unit) formed on a substrate, and phase shifters 103-1 to 103-12 that change a phase of light passing through an optical waveguide of the optical waveguide chip 102 are disposed as driven elements on the optical waveguide of the optical waveguide chip 102. Further, the control unit includes a power source 106 (a power driving element such as a current generation unit or a power supply) that supplies power to the phase shifters, and includes wirings 104-1 to 104-12 (connection portions) for connecting the respective phase shifters to the power source, and electrical switches 105-1 to 105-12 that perform ON/OFF switching of the connections.

As illustrated in a cross-sectional view of an optical waveguide chip substrate of FIG. 1(b), the phase shifter includes a heater 1001 and an optical waveguide 1007 disposed immediately below the heater 1001, and a control signal is applied to the phase shifter so that a phase of an optical signal passing through the optical waveguide of a relevant portion is modulated through a thermo-optical effect (for example, a change in a refractive index due to heat). The optical waveguide is formed of, for example, a quartz-based optical waveguide, a polymer waveguide, or silicon. Although an embedded waveguide will be described as an example in FIG. 1(b), other rib-type or diffusion-type structures may be used.

The phase shifter constitutes a part of an MZI as illustrated in a partial top view of FIG. 1(c). That is, the MZI illustrated in FIG. 1(c) is disposed at a location of each phase shifter in FIG. 1(a). In the MZI, an optical signal input from an input 1002 is bifurcated into arm waveguides 1006 and 1007 by a directional coupler 1004. The heater 1001 is installed above the arm waveguide 1006 on one side to modulate a phase of an optical signal passing through the arm waveguide 1006 via a thermo-optical effect. The optical signals via the arm waveguides 1006 and 1007 are multiplexed by a directional coupler 1005 and distributed and output to an output 1003 or 1008 due to a phase difference between the optical signals via the arm waveguides 1006 and 1007, which functions as an optical switch.

In this configuration, the phase shifters are disposed in 4 rows and 3 columns.

Further, when power is supplied, a plurality of phase shifters are connected in parallel to the power source so that the plurality of phase shifters can be controlled by one power source. In the MZI, when structures of the heater and the optical waveguide are the same, the heater and the optical waveguide are connected in parallel and supplied with the same power so that the heater and the optical waveguide can be driven simultaneously. Specifically, when the structure and composition of the heaters are the same, resistance values R are the same, and amounts of generated heat $W=V^2/R$ with application of a voltage V is also constant. In this case, when the structures of the optical waveguides of the MZIs are the same, amounts of generated heat required for switching of the optical path due to the thermo-optical effect are also the same, and thus it is possible to simultaneously drive and control a plurality of MZIs by applying the same voltage in parallel.

Thus, in this case, even in a case in which the structures of the optical waveguide and the heater differ from each other, when the amount of generated heat required for switching between the optical paths of the MZI is given to both MZIs at the time of application of the same voltage, it is possible to drive the optical waveguide and the heater simultaneously by connecting the optical waveguide and the heater in parallel and supplying the same power to the optical waveguide and the heater.

Selection of the MZIs to be driven can be made by the electrical switches 105-1 to 105-12.

Embodiment 2

Figure 2:
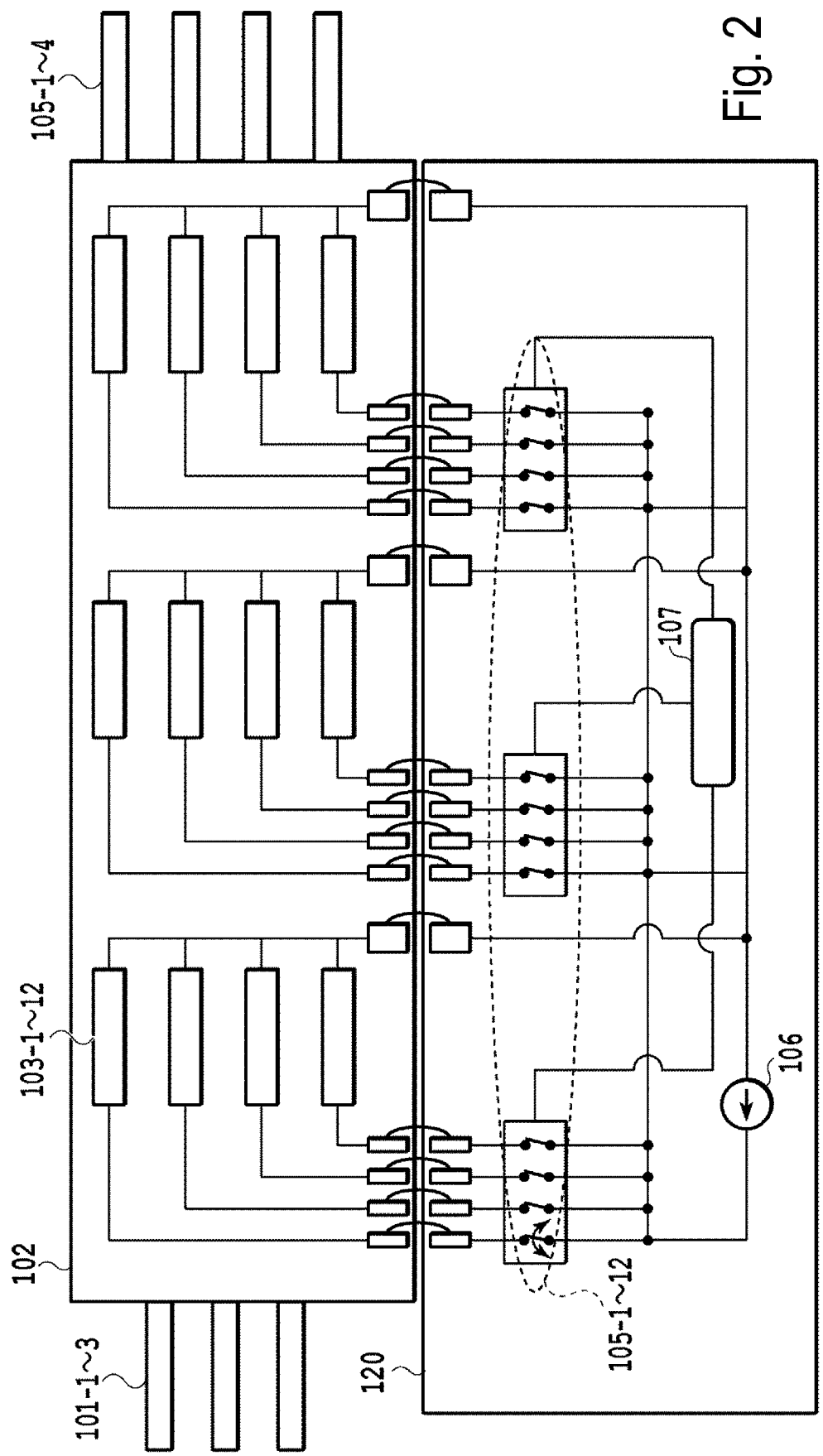
FIG. 2 is a diagram illustrating a configuration of an optical signal processing device according to Embodiment 2 of the present invention.

FIG. 2 illustrates a configuration of an optical signal processing device according to Embodiment 2. The optical signal processing device in Embodiment 2 is an optical switch having three inputs and four outputs, and input optical fibers 101-1 to 3 and output optical fibers 105-1 to 4 are optically connected to an optical waveguide chip 102 having phase shifters 103-1 to 103-12 mounted therein. Further, the control unit 120 that electrically controls the phase shifters 103-1 to 103-12 includes electrical switches 105-1 to 105-12, a control circuit 107 that controls the electrical switches, and a power source 106 that serves as a drive power supply for the phase shifters.

In general, a multi-input multi-output optical switch using an optical waveguide is realized by connecting a plurality of MZIs. In the switch of FIG. 2, the output fibers 105 from which signal light input from the input optical fiber 101 is output are selected depending on which of the phase shifters 103 is driven. Because the optical switch of this embodiment is a 3-input 4-output switch, there are 3×4=12 switch states. 12 degrees of freedom are required to set the 12 states independently, and it is necessary for the 12 phase shifters to be controlled independently. Further, when one switch element is constructed by two MZIs (DG-MZI: double gate MZI), the number of phase shifters that need to be controlled is doubled, and here, the number is 24.

Conceptual Diagram of Multi-Input Multi-Output Switch

Figure 3:
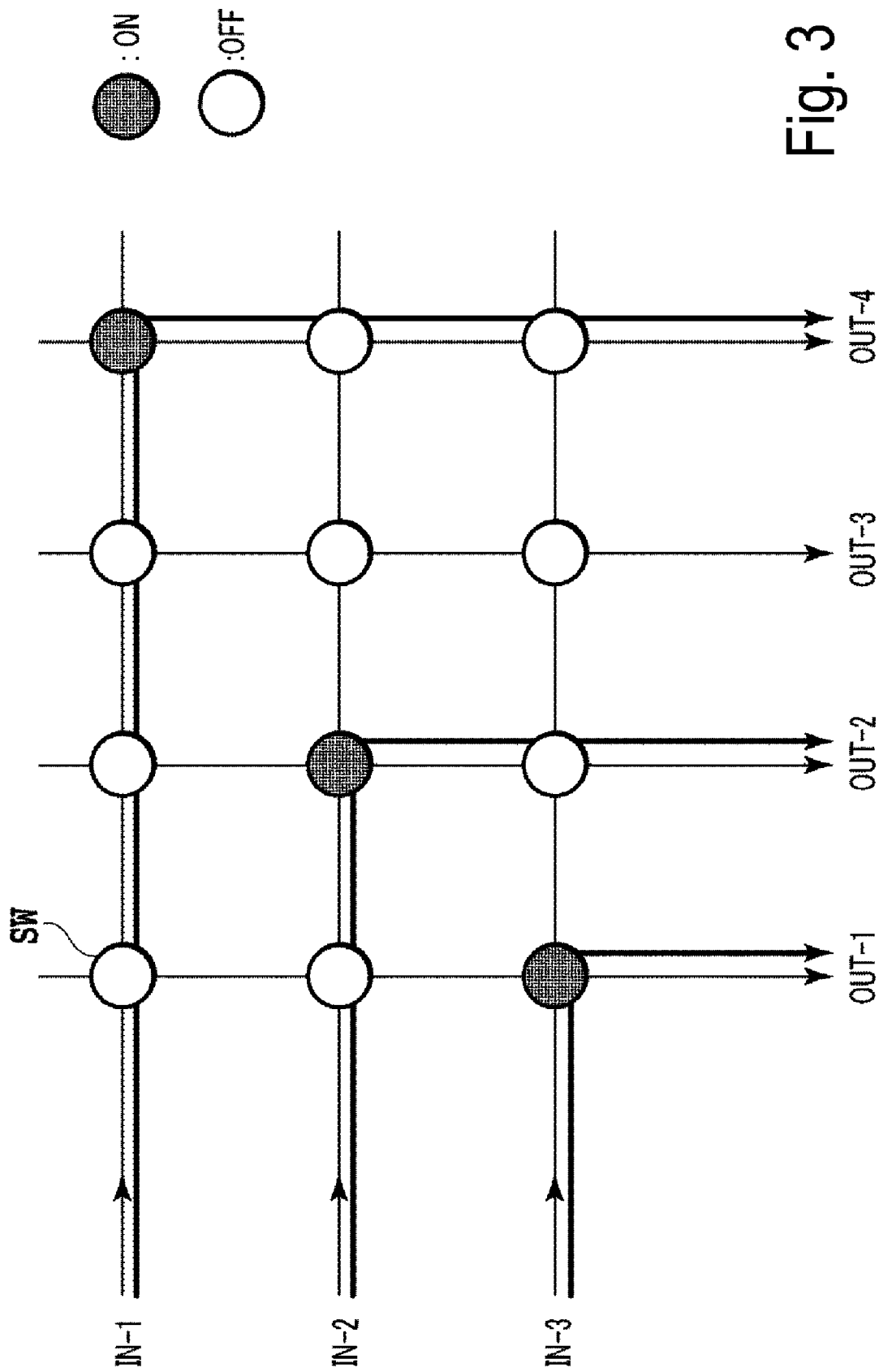
FIG. 3 is a conceptual diagram of a matrix switch.

When the optical switch is a matrix switch, the maximum number of switch elements driven simultaneously can be smaller than the number of phase shifters. FIG. 3 illustrates a conceptual diagram of such a multi-input multi-output matrix switch. Here, in order to select to which output side (a vertical axis) a signal input from an input side (a horizontal axis) is connected, switching between a connection to the vertical axis (ON) and no connection to the vertical axis (OFF) is performed by a switch element SW at each intersection between the horizontal axis and the vertical axis. Thus, the optical switches SW are disposed at respective intersections and controlled by the phase shifters, so that the optical switches SW function as the multi-input multi-output matrix switch. In this case, the optical switch SW is designed to be OFF when no power is supplied, so that the smaller one between the number of inputs and the number of outputs becomes the maximum number of phase shifters that need to be supplied.

Thus, because the maximum number of phase shifters that need to be supplied with power simultaneously is the smaller one between the number of inputs and the number of outputs of the multi-input multi-output switch, the number to be simultaneously connected to the power supply (the number of electrical switches to be turned ON) becomes the smaller one of the number of inputs and the number of outputs.

When a constant current source allowing a constant current to flow is used as the power supply, it is possible to perform simultaneous control by driving the maximum number of phase shifters that need to be controlled. In this case, when a state in which an optical signal input from an input fiber is not output from any output fiber is desired to be created, a phase shifter (driven element) that does not contribute to the control of the optical signal is prepared, and the number of phase shifters to be driven together with the phase shifter is set to a constant number of the maximum number of phase shifters that need to be controlled, thereby realizing simultaneous control.

Embodiment 3

When the optical switch is a multicast switch (MCS), the maximum number of phase shifters to be driven simultaneously as described above can be smaller than the total number of phase shifters.

Figure 4:
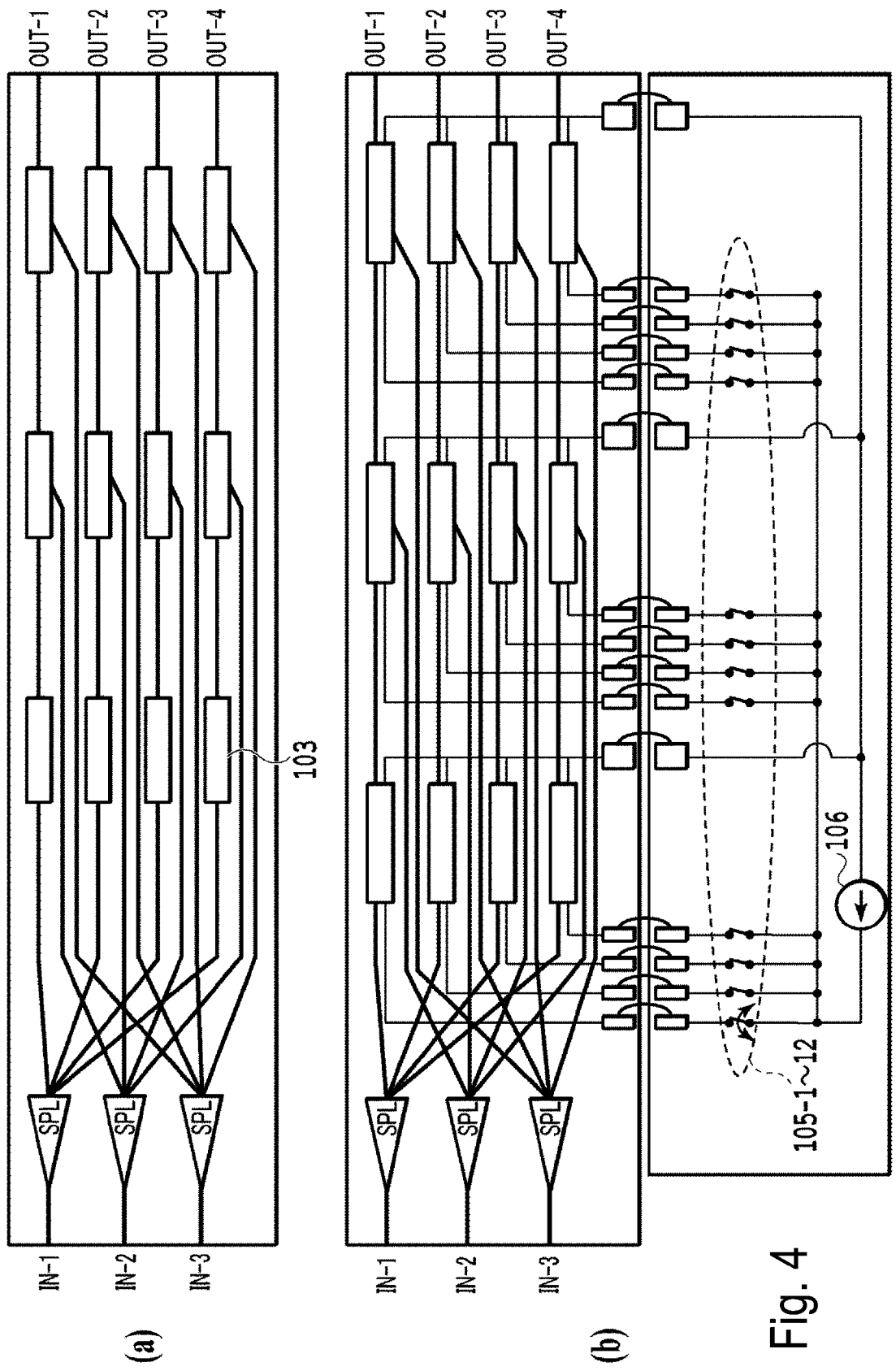
FIG. 4 is a diagram illustrating a configuration of a multicast switch (MCS) according to Embodiment 3 of the present invention.

FIG. 4 illustrates a configuration of such an MCS as Embodiment 3. FIG. 4(a) is a diagram illustrating only optical paths of the MCS and switch elements (phase shifters 103), and FIG. 4(b) also illustrates the same electrical control system as in FIGS. 1 and 2.

In the MCS of FIG. 4, signal light from each of optical inputs IN-1 to IN-3 is split by a splitter SPL, and the signal light of a certain input port to be connected to respective output ports OUT-1 to OUT-3 is selected by a switch element (a phase shifter 103). In order to select whether the signal light of the input port is connected to each output port, for example, in the case of a 3-input 4-output MCS, three switch elements are disposed for each output port and controlled by the phase shifters 103.

In this case, because the number of input ports that can be connected to the output port is one, by designing the optical switch such that the signal from the input port is not connected in a state in which there is no power supply, phase shifters are controlled one by one for each output port, making it possible to realize switching to all the output ports. In this case, the maximum number of phase shifters to be driven is four.

Further, in the MCS, the input ports and the output ports can be inverted and used due to reversibility of light, but in this case, a function of the switch changes because the splitter functions as a coupler. Thus, in this case, the maximum number of phase shifters to be driven is the number of input ports.

Embodiment 4

In Embodiment 3 above, it has been described that when the matrix switch or the MCS includes MZIs, the maximum value of the number of switch elements for supplying power becomes a constant value which depends on the switch scale. Here, in an M-input N-output matrix switch, a maximum of N switch elements may be driven, and in an M×NMCS that splits an input signal into N signals, a maximum of N switch elements may also be driven. Further, in the M×NMCS that splits an input signal into N signals, a maximum of M switch elements may be driven.

In this case, in the matrix switch or MCS, each switch element is driven to connect a specific input to a specific output. Thus, for example, in the matrix switch, it is necessary to drive only one switch element for the same output port, and in the MCS, when a split signal is output, it is necessary to drive only one switch element for the same output port. When the input signals are multiplexed and output, it is necessary to drive only one switch element for the same input port.

When a switch scale such as M-input and N-output becomes large, a capacity of one power driving element may be insufficient to drive all necessary switch elements in parallel with the power driving element. Such a problem can be solved by allocating a plurality of power driving elements to switch elements connected in parallel. In the matrix switch, switch elements for the same output port are connected to the same power driving element, and in the MCS, when a split signal is output, switch elements for the same output port are also connected to the same power driving element, making it possible to evenly divide a load of a power driving element. As a matter of course, when the input signals are multiplexed and output, the switch element regarding the same input port may be connected to the same power driving element.

Embodiment 5

In Embodiment 4, the case in which the matrix switch or the MCS are configured by the MZIs has been described. In this case, it has been described that the maximum number of switch elements that supply a power is a constant value which depends on the switch scale. However, when an M×N switch is divided into a plurality of multi-input multi-output switches, switch elements other than the switches may be required.

Figure 5:
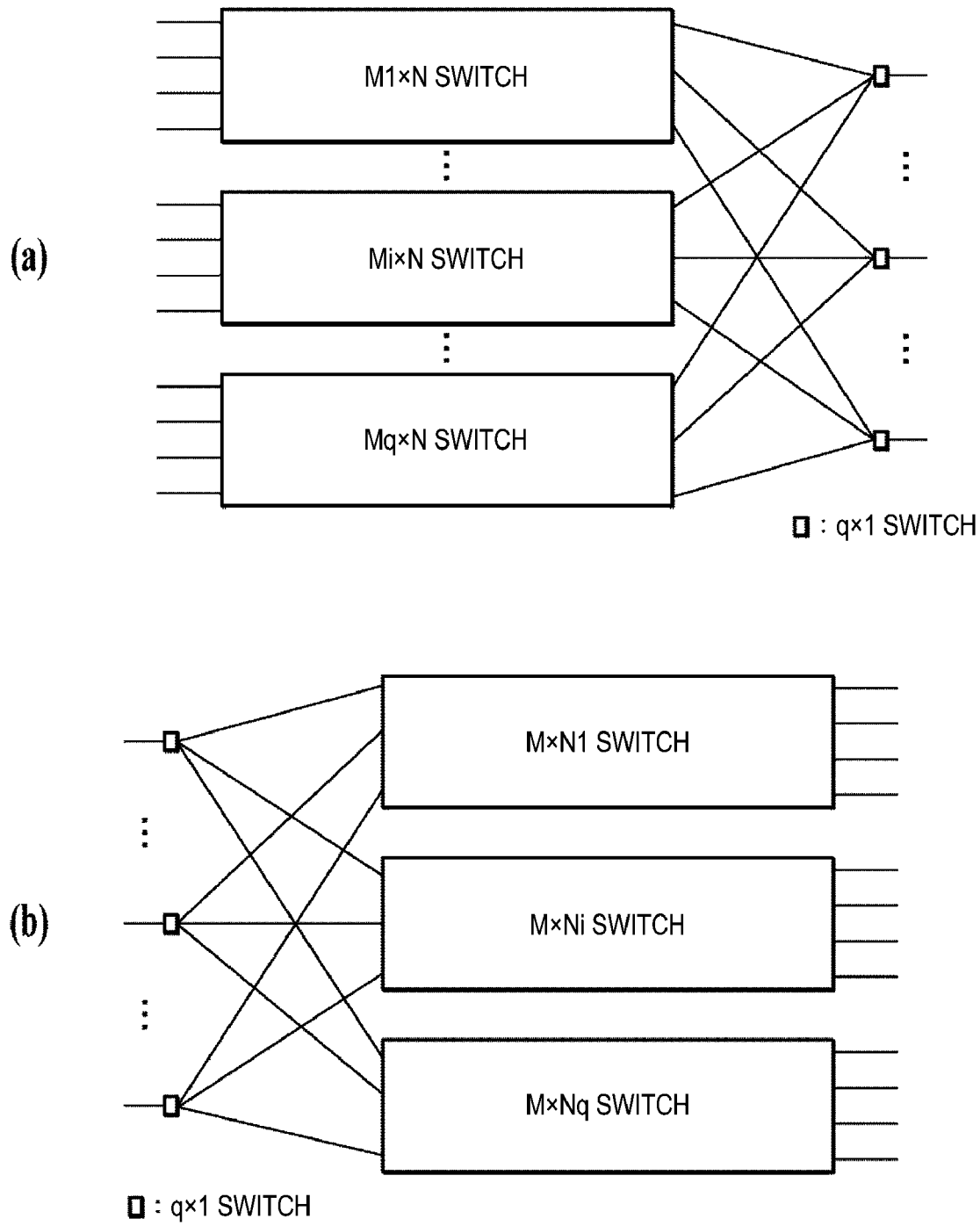
FIG. 5 is a diagram illustrating a configuration when an M×N switch is divided into q multi-input multi-output switches in Embodiment 5 of the present invention.

FIG. 5 illustrates a configuration in which the M×N switch is divided into q multi-input multi-output switches in Embodiment 5.

Figure 6:
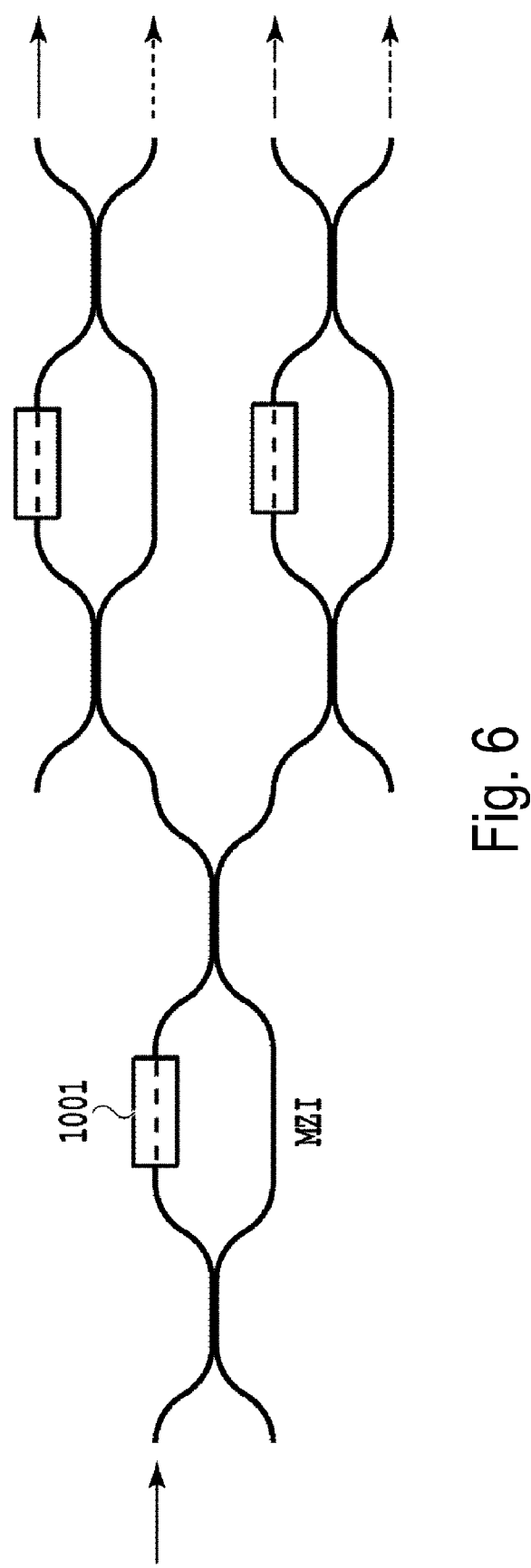
FIG. 6 is a diagram illustrating an optical switch configured by a multi-stage connection of MZIs.
Figure 7:
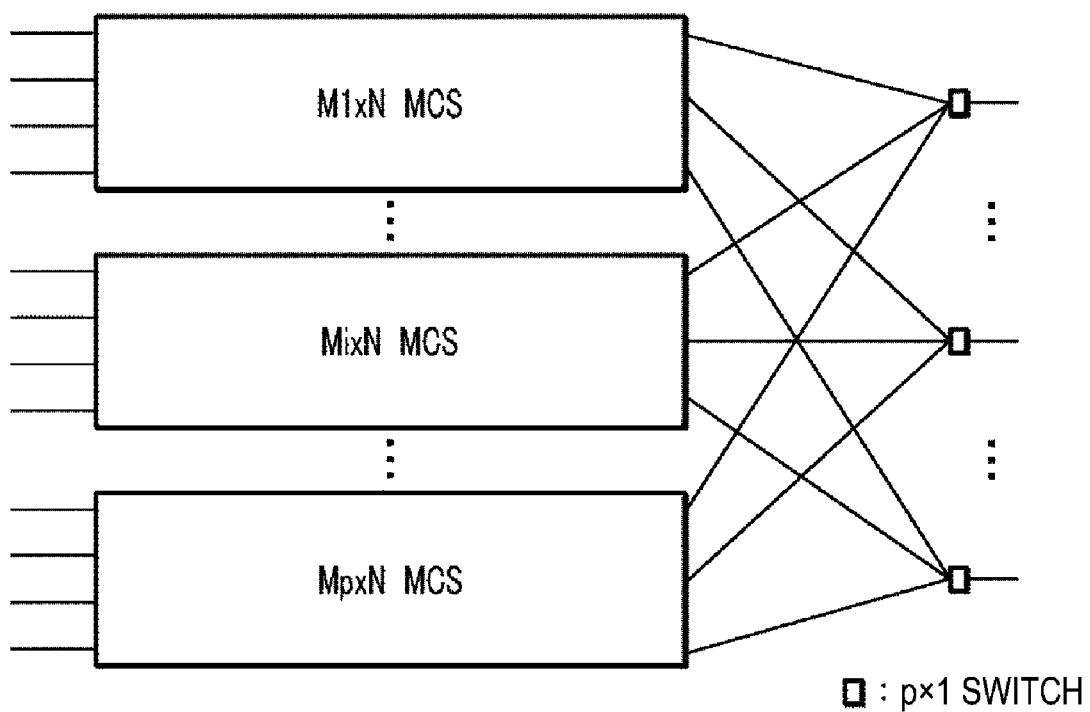
FIG. 7 is a diagram illustrating an optical switch obtained by dividing an (M×N) MCS into q MCSs.

In FIG. 5(*a*), a sum of M1 to Mq is M, and in FIG. 5(*b*), a sum of N1 to Nq is N. In this case, q×1 switches (output side in FIG. 5(*a*)) and 1×q switches (input side in FIG. 5(*b*)) are required in addition to the M×N switch elements constituting the q multi-input multi-output switches. These can be realized by switching between the optical paths in the MZI in the case of 1×2 or 2×1, and can also be realized by connecting a 1×2 or 2×1 switch including MZIs as illustrated in FIG. 6 in multiple stages in the case of a larger scale (q is a natural number equal to or greater than 3). Such a configuration is also applied to a case in which the (M×N) MCS as illustrated in FIG. 7 is divided into q MCSs.

In a case where the 1×q switch or q×1 switch is formed of the MZI, when the optical path is switched with or without supply of a power, there is a a switch state in which the 1×q switch or q×1 switch is connected without supplying power. Thus, total power consumption changes depending on the switch state.

Push-Pull Driven MZI

Figure 8:
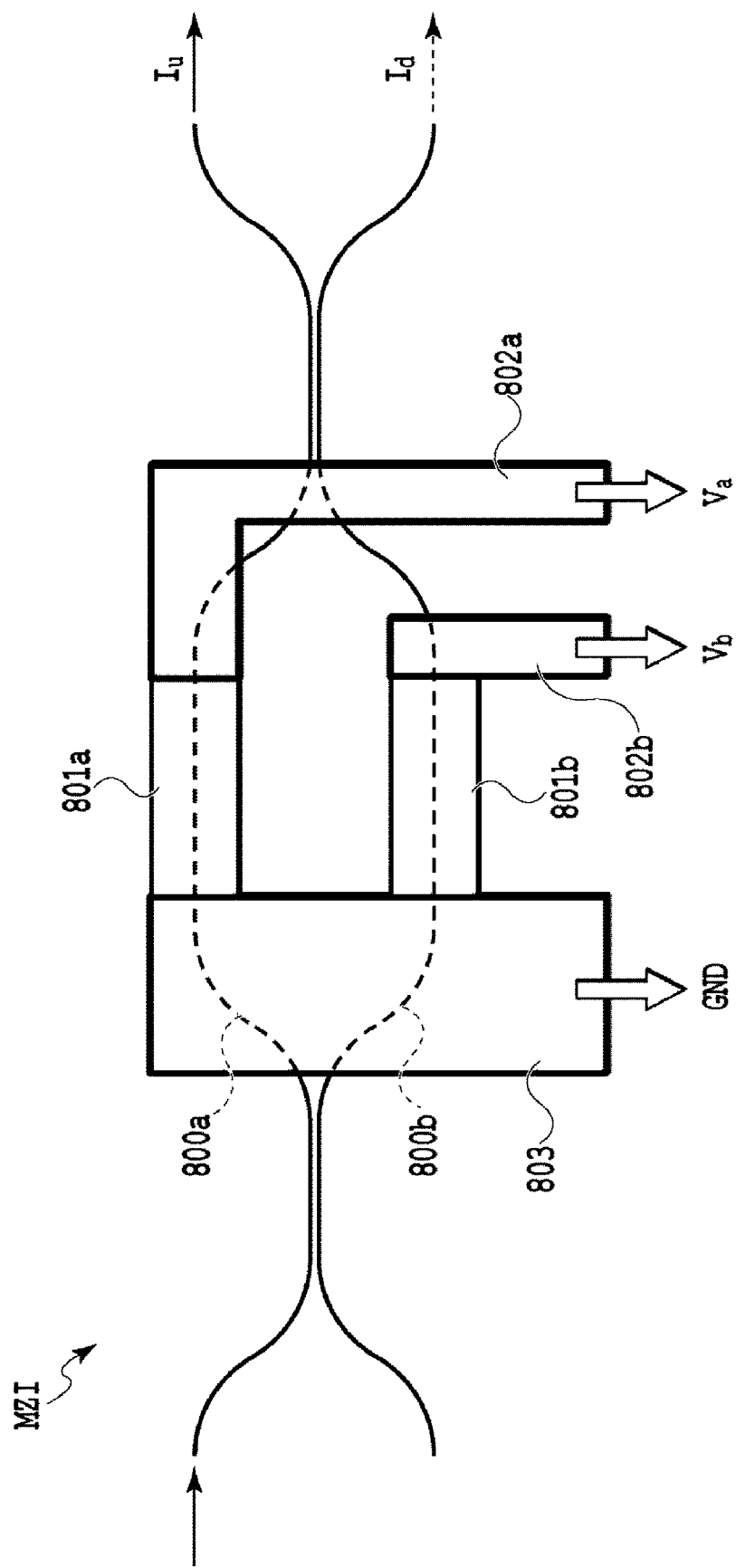
FIG. 8 is a diagram illustrating a push-pull driven MZI according to Embodiment 5 of the present invention.

On the other hand, when the MZI is operated in a push-pull type as illustrated in FIG. 8, power consumption of the 1×q switch and the q×1 switch does not change regardless of the switch state, and the power consumption in the 1×q switch and the q×1 switch can be halved as compared with a maximum value when the optical path is switched with or without the supply of the power.

In the push-pull driven MZI of FIG. 8, phase shifters (heaters 801*a* and 801*b* in FIG. 8) are provided in both upper and lower arms 800*a* and 800*b* of the MZI, and the heaters 801*a* and 801*b* are grounded to a common ground wiring 803 and pushed-pull driven by driving voltages Va and Vb from the power supply driving unit via separate power supply lines 802*a* and 802*b*, thereby switching a light output destination depending on to which one the power is supplied.

In such a case, the 1×q switch or the q×1 switch differs from M×N switch elements constituting another M×N switch or MCS in terms of power to be supplied. Thus, only the 1×q switch or q×1 switch is connected in parallel to the same power driving element and shared, and the M×N switch elements constituting the M×N switch or MCS are connected to another power driving element, making it possible to have the configuration of the entire switch as described above while curbing the required number of power driving elements.

Further, by making the design of the MZI of the 1×q switch different from that of other switch elements, it is possible to perform control with the same power driving element.

When the 1×q switch is to be push-pull driven, for example, it is designed such that a phase difference $\varphi_0 = \pi/2 + 2n\pi$ (n is an integer) is present between the optical signals passing through the two arms of the MZI.

Here, assuming that amounts of phase shift due to the phase shifters disposed on the upper and lower arms are $\Delta\varphi_u$ and $\Delta\varphi_d$, respectively, intensities ($I_u$, $I_d$) of the light output from the upper and lower right sides at the time of input of light from the upper left waveguide of FIG. 8 to the MZI are as in the following equation.

$$I_d = 0.5 * (1 + \cos(0.5\pi + 2n\pi + \Delta\varphi_u - \Delta\varphi_d)) \quad (1)$$

(N is an integer)

$$I_u = 1 - I_d \quad (2)$$

Here, in order to maximize $I_d$, the heater of the lower arm is driven so that $\Delta\varphi_d = 0.5\pi$ and $\Delta\varphi_u = 0$, and in order to maximize $I_u$, the heater of the upper arm is driven so that $\Delta\varphi_d = 0$ and $\Delta\varphi_u = 0.5\pi$.

On the other hand, the MZIs that constitute another switch element that is not push-pull driven are designed so that a phase difference $\phi_0 = n\pi$ (n is an integer) is present between the optical signals passing through the two arms, and the phase shifter (heater) is disposed on only one of the upper and lower arms of the MZI. In the following description, it is assumed that the upper arm is longer and the phase shifter is disposed only in the lower arm.

When light is input to the MZI from the waveguide on the upper left of FIG. 8, intensities ($I_u$, $I_d$) of light output from the upper and lower right sides are as shown in the following equation.

$$I_d = 0.5 * (1 + \cos(n\pi - \Delta\phi_d)) \quad (3)$$

(N is an integer)

$$I_u = 1 - I_d \quad (4)$$

Here, when power is supplied only to the switch element in an ON state so that $I_d$ is maximized as illustrated in FIG. 3, power is supplied so that $n\pi - \Delta\phi_d = 2n\pi$ (n is an integer).

When structures of the MZI and the phase shifter are the same, amounts of phase shift or resistances of the phase shifters with respect to the power supplied to the phase shifters are the same. Thus, when the push-pull driven MZI and the MZI that performs phase shift with only one arm are electrically connected in parallel in the same structure, the same amounts of power are supplied and outputs of both cannot be maximized simultaneously.

Figure 9:
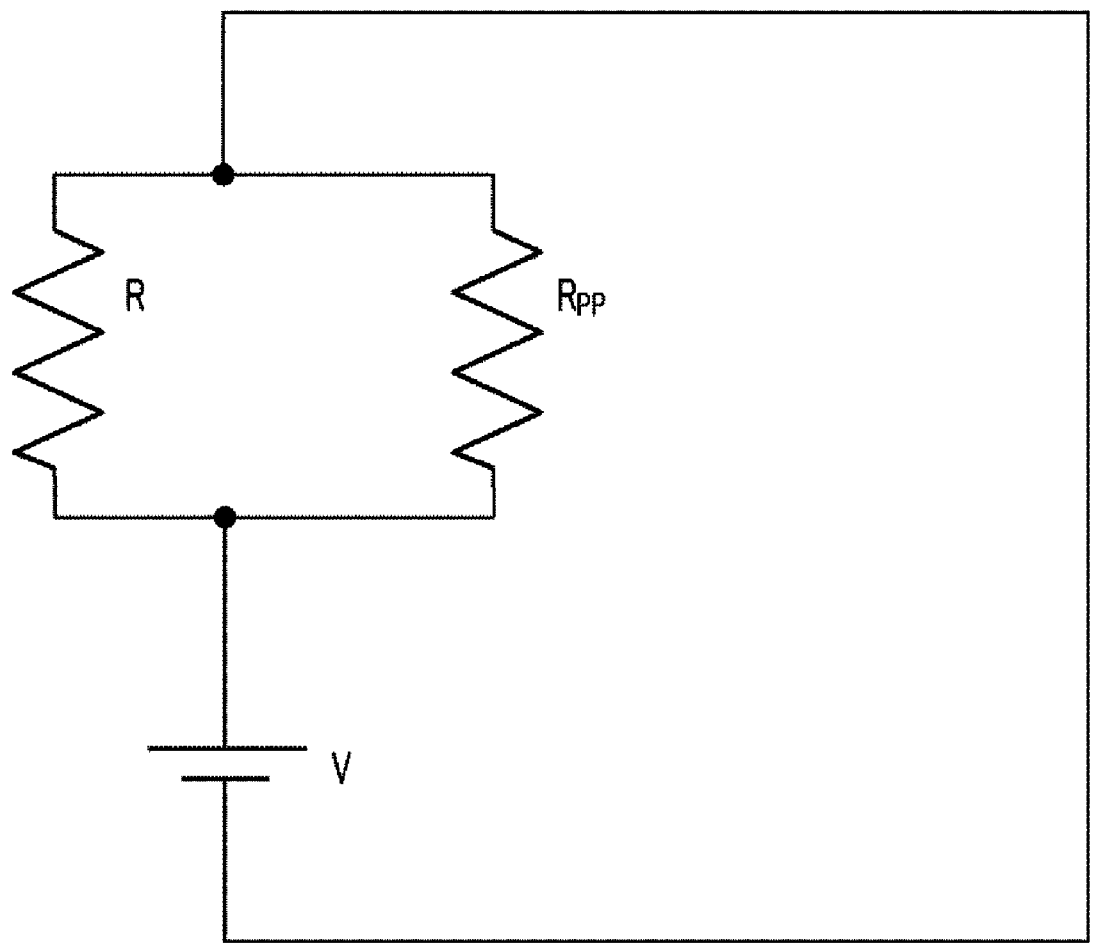
FIG. 9 is an equivalent circuit diagram when two types of MZIs are electrically connected in parallel one by one.

It is possible to simultaneously maximize the outputs at the time of electrical parallel connection by making the structures of the two types of MZIs and the phase shifters different. FIG. 9 illustrates an equivalent circuit in a case where phase shifters are used as heaters and the two types of MZIs are electrically connected in parallel one by one.

Assuming that a phase change amount is proportional to the power supply amount for the heater, a phase modulation amount required in the case of push-pull driving is half ($0.5\pi$ and $\pi$) as compared with the case of only one side arm driving and thus, the MZI and the heater (the phase shifter) may be designed so that the power supply amount is halved when the assumption is considered.

The voltage V applied to the two heaters (the phase shifters) electrically connected in parallel is constant unless there is another circuit factor. In this case, when a resistance value of the heater of the push-pull driven MZI is RPP and a resistance value of the heater of the only one side arm driven MZI is R, amounts of generated heat of the respective heaters is $V^2/RPP$ and $V^2/R$, respectively. From this equation, it is necessary to set RPP=2R in order for the amount of generated heat in the heater of the push-pull driven MZI to be half the amount of generated heat in the heater of the only one side arm driven MZI.

Such a change in resistance value can be achieved by increasing a heater length. Because the resistance value of the heater is proportional to the heater length, a condition of RPP=2R can be satisfied by doubling the heater length of the push-pull driven MZI.

Thus, making the design of the two types of MZIs different, electrically connecting in parallel the MZIs that are electrically driven under different conditions, and driving the MZIs allow a switch element including a DG-MZI and a switch element including a single MZI to be connected.

For example, when the two MZIs constituting the DG-MZI are operated as a 1×2 switch, the MZIs can be driven even when the respective phase shifters are electrically connected in series. When a plurality of switch elements having different numbers of MZIs electrically connected in series are electrically connected in parallel to the same power driving element, a heater length or the like of the MZI is adjusted so that a power supplied to each MZI becomes a driving power for each MZI, which enables the switch elements electrically connected in parallel to be driven.

Embodiment 6

In Embodiment 6, a scheme for curbing a variation in the amount of power supplied to the respective phase shifters will be described with reference to FIG. 10.

When the optical signal processing device includes an electrically driven optical waveguide chip, lengths of driving wirings for access to the phase shifters differ depending on positions of the phase shifters in the chip. For example, in the case of the optical signal processing devices (FIGS. 1, 2 and 4) of Embodiments 1 to 3 described above, the lengths of the driving wirings become longer when the phase shifters are farther from the control unit.

Figure 10:
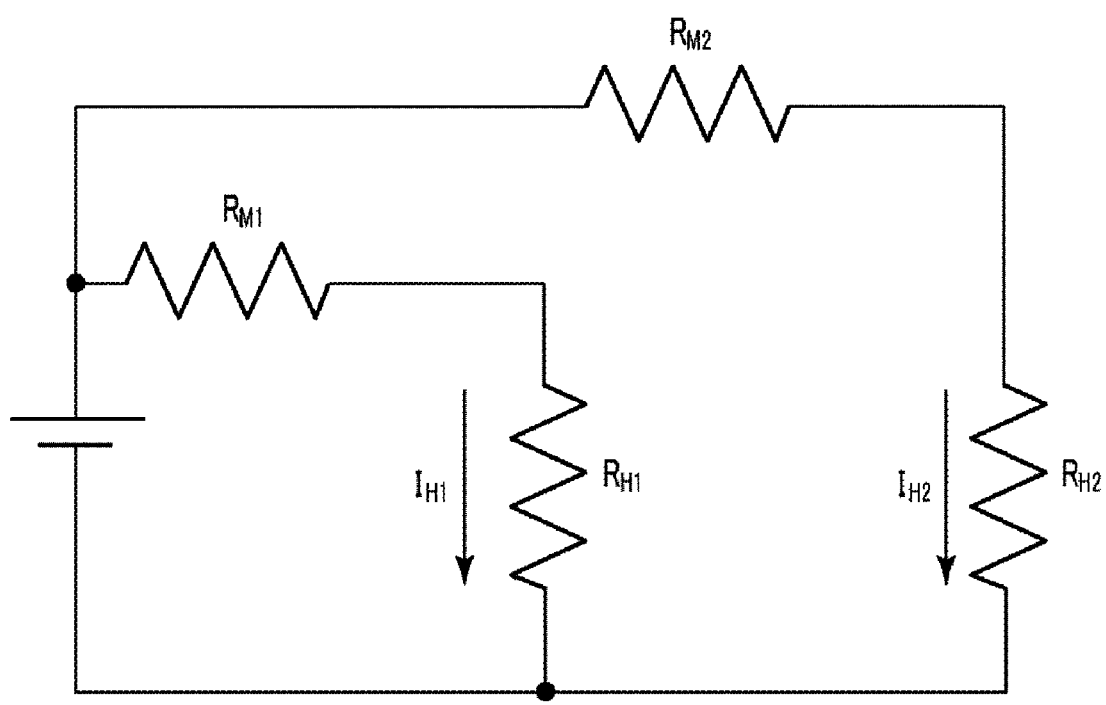
FIG. 10 is a diagram illustrating a scheme of curbing variation in an amount of power supplied to each phase shifter according to Embodiment 6 of the present invention.

FIG. 10 illustrates an equivalent circuit of the drive circuit when the driving wiring is long (the phase shifter is away from the control unit) and when the driving wiring is short (the phase shifter is close to the control unit).

When the control is performed with the same power supply and the amounts of generated heat in the heaters have the same value, $R_{H1} \times I_{H1} = R_{H2} \times I_{H2}$.

Here, $R_{H1}$ and $R_{H2}$ are resistance values of the heaters, and $I_{H1}$ and $I_{H2}$ are current values flowing through the heaters.

When the resistance values of the heaters are the same ($R_{H1} = R_{H2}$), current values flowing through the heaters need to be the same ($I_{H1} = I_{H2}$). For this purpose, total resistance values of the entire circuits need to be the same ($R_{H1} + R_{M1} = R_{H2} + R_{M2}$, wherein $R_{M1}$ and $R_{M2}$ are wiring resistances of the driving wirings), which requires the same resistances of the driving wirings ($R_{M1} = R_{M2}$).

The resistance value of the driving wiring is determined by a product of a resistance value $R_m$ per unit length and a wiring length L, and a value of $R_m$ decreases when a cross-sectional area of the wiring increases. Thus, when the wiring cross-sectional areas are the same, the resistance value increases when the driving wiring becomes longer, and a difference occurs between $R_{M1}$ and $R_{M2}$.

This can be solved by increasing the cross-sectional area of the wiring when the wiring length is longer. When the wiring is manufactured through a wafer process, it is difficult for the thickness of the wiring to be controlled and it is easier for the width of the wiring to be controlled. Thus, the width is increased when the driving wiring becomes longer, making it possible to bring values of $R_{M1}$ and $R_{M2}$ closer to each other (FIG. 10). Further, because the resistance value Rm per unit length is inversely proportional to the cross-sectional area, setting the wiring width to be proportional to a wiring length of the driving wiring enables $R_{M1} = R_{M2}$.

Embodiment 7

In Embodiment 7, a scheme for curbing a variation in the amount of power supplied to each phase shifter will be described with reference to FIGS. 11 and 12.

When an optical waveguide chip of an optical signal processing device is manufactured through a wafer process, a property of a heater or the like used for a phase shifter may change depending on a position in a wafer. This is because the resistance value of the heater changes due to uneven film thickness of the heater and warpage of the wafer.

Figure 11:
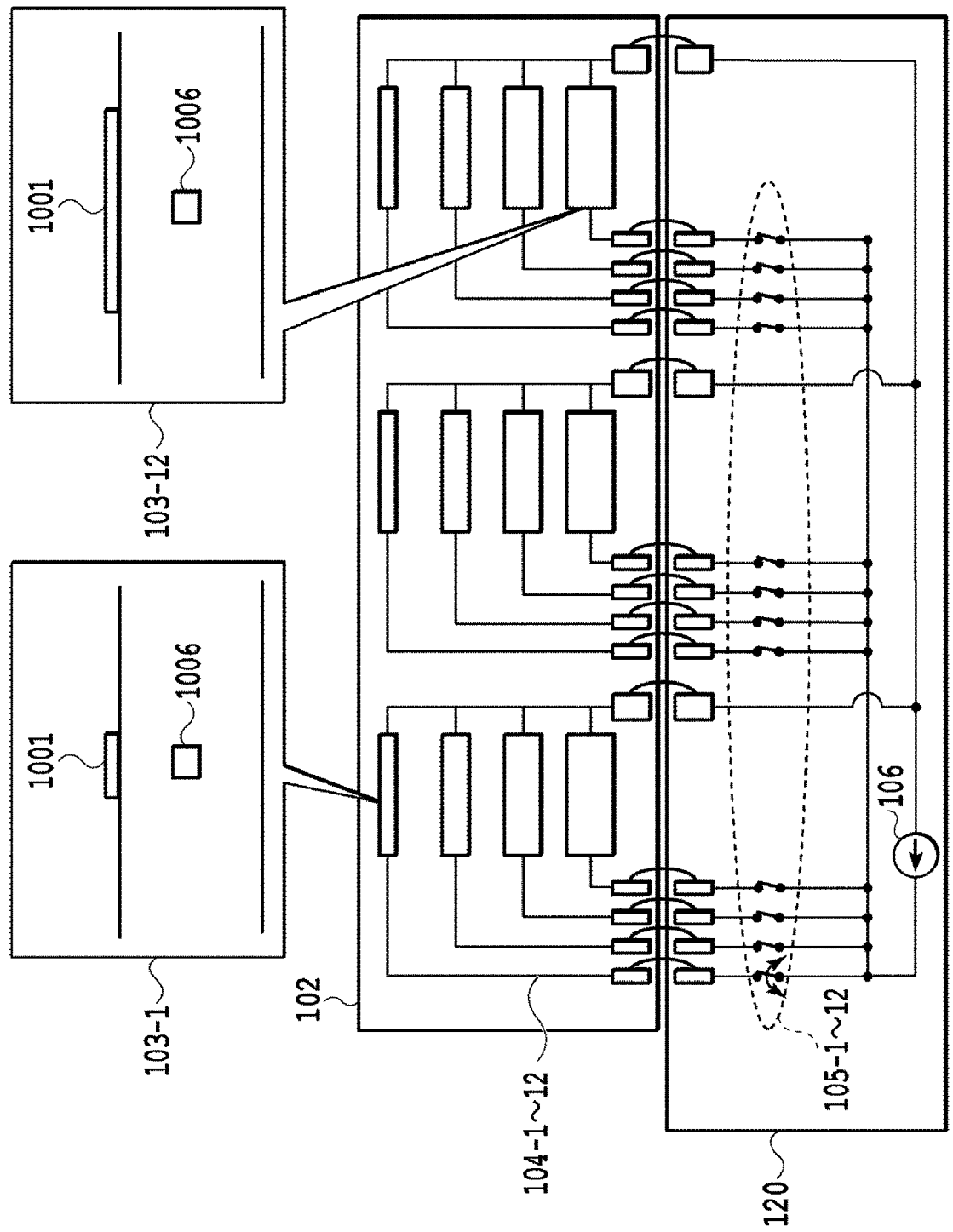
FIG. 11 is a diagram illustrating an optical signal processing device according to Embodiment 7 of the present invention.
Figure 12:
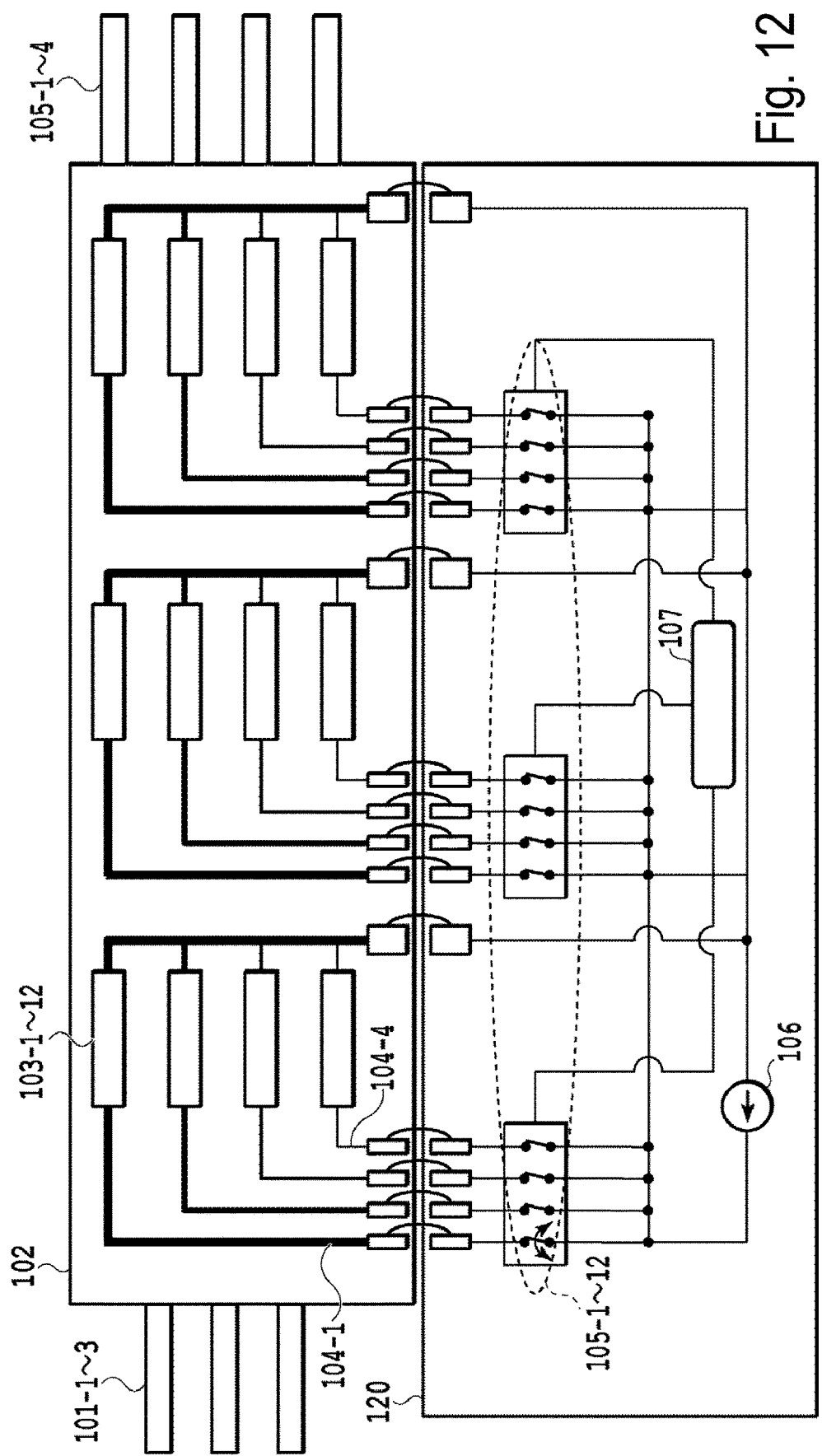
FIG. 12 is a diagram illustrating the optical signal processing device according to Embodiment 7 of the present invention.

On the other hand, correction can be made by changing a structure of the heater according to the variation in the resistance value in the wafer, as illustrated in FIG. 11. The heater width is made small in a place in which the resistance value of the heater is small in the wafer (103-1 in FIG. 11), and the heater width is made large in a place in which the resistance value of the heater is great in the wafer (103-12 in FIG. 11), such that an in-plane heater resistance value can be made constant.

Further, similarly, a resistance value of the driving wiring having access to the phase shifter also varies. The wiring width is made small in a place in which the wiring resistance value is small in the wafer (104-4 in FIG. 12), and the wiring width is made large in a place in which the wiring resistance value is marked in the wafer (104-1 in FIG. 12), such that an in-plane heater resistance value can be made constant, as illustrated in FIG. 12.

When a plurality of optical waveguide chips are manufactured in a wafer, the distribution of the heater width and the driving wiring width changes in each chip. The method that involves adjusting the heater width has been described as a method for adjusting the resistance value of the heater, but there is also a method that involves changing the heater length. When the heater length is made long, the resistance value increases, and when the heater length is made short, the resistance value decreases. Similarly, even when the wiring resistance value is adjusted depending on the length, the same effects as in the case of the width change can be expected.

Embodiment 8

Figure 13:
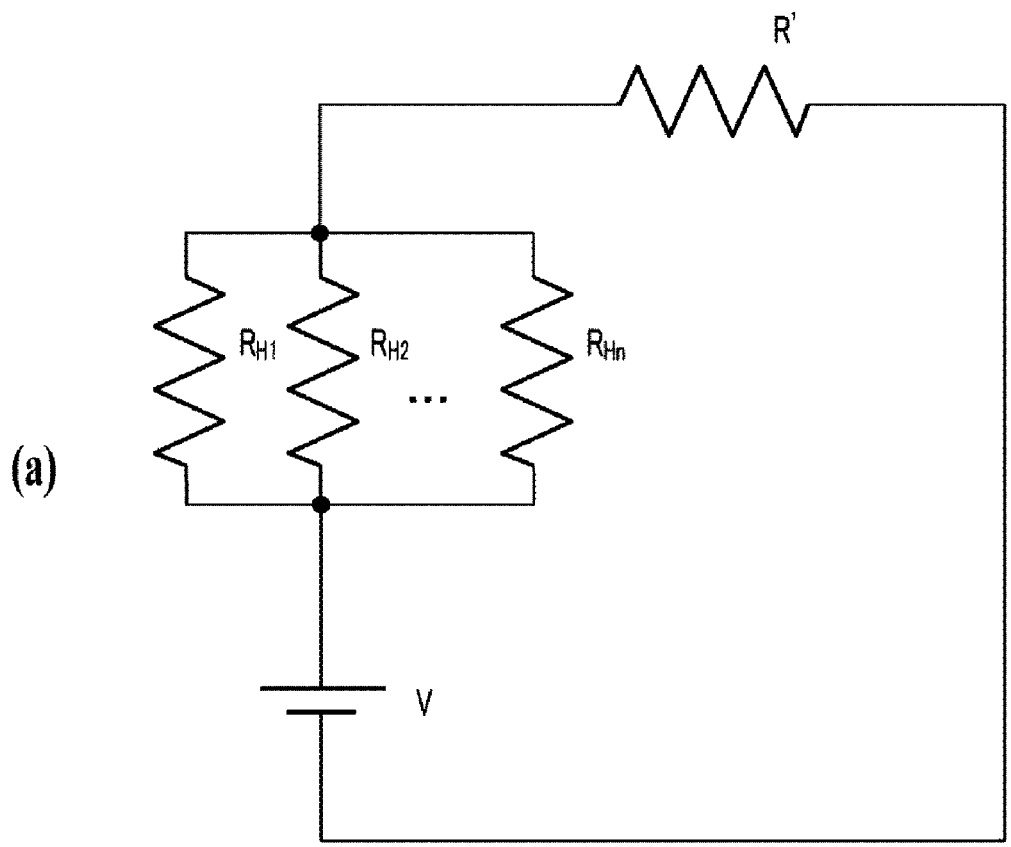
FIG. 13 is a diagram illustrating a scheme for adjusting an amount of power supplied from a power driving element of an optical signal processing device according to Embodiment 8 of the present invention.
Figure 13:
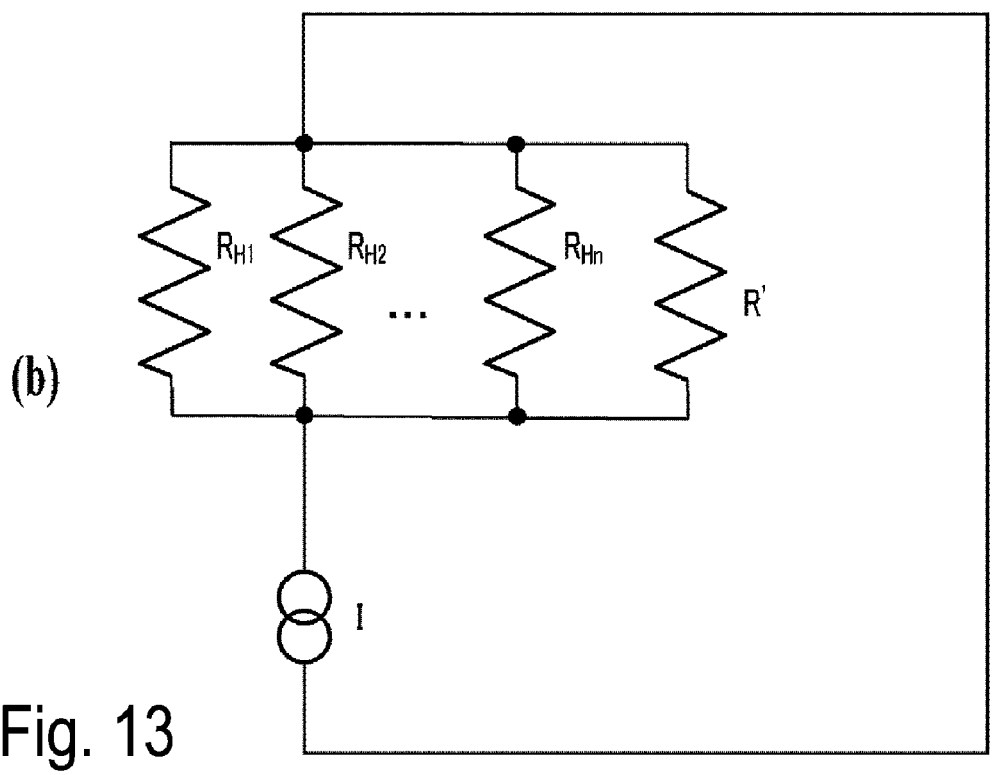

In Embodiment 8, a mechanism for adjusting the amount of power supplied from a power driving element to the optical signal processing device of the present invention will be described with reference to FIG. 13.

As described in the above embodiment, when an optical waveguide such as a PLC is used for the optical signal processing unit, it may be necessary to adjust the power supply amount for each chip. Further, in the matrix switch, the PILOSS switch, and the multicast switch, some of all driven elements may be driven depending on a switching state to be set, as described above.

In Embodiment 8, a mechanism that adjusts the amount of power supplied to the driven element of each chip when the power driving element is a constant voltage source and a constant current source is proposed to solve such a problem.

Case of Constant Voltage Source

FIG. 13(a) illustrates an equivalent circuit of a power supply amount adjustment mechanism of Embodiment 8 when a constant voltage source V is used.

A plurality of driven elements such as heaters are connected in parallel to the constant voltage source V, and the same voltage is applied to these driven elements. In this case, resistance values of the driven elements are $R_{H1}$ to $R_{Hn}$, respectively. Further, an electrical switch that performs power supply ON/OFF switching is connected to each driven element. A resistor R' is connected in series with the driven elements.

A combined resistance $R_{HT}$ of the driven elements connected in parallel is as follows when resistance values of all the driven elements connected in parallel are the same and are $R_H$.

$$R_{HT} = \frac{R_H}{n} \tag{5}$$

Here, n is the number of driven elements for which the power supply is ON.

When the voltage of the constant voltage source is V, a power $W_H$ supplied to each driving element is as follows.

$$W_H = \frac{W_{HT}}{n} = \frac{V^2}{n(R_{HT} + R')}\left(\frac{R_{HT}}{R_{HT} + R'}\right) \tag{6}$$

Here, $W_{HT}$ is an amount of power supplied to all the connected driven elements.

Thus, it is possible to adjust the amount of power supplied to the driven elements by adjusting a resistance value of the resistor R'. Further, it is possible to adjust an amount of power given to an optical signal processing unit of a different chip with a common control unit or a common current generation unit by providing the resistor in a connection portion or a current generation unit in another embodiment. In addition, use of a variable resistor for the above-described resistor R' allows the connection portion or the current generation unit to be shared.

Case of Constant Current Source

FIG. 13(b) illustrates an equivalent circuit of the power supply amount adjustment mechanism of Embodiment 8 when a constant current source I is used.

A plurality of driven elements such as heaters are connected in parallel to the constant current source I, and the same voltage is applied to the driven elements. In this case, resistance values of the driven elements are $R_{H1}$ to $R_{Hn}$, respectively. Further, an electrical switch that performs power supply ON/OFF switching is connected to each driven element. A resistor R' is connected in parallel to the driven elements.

A combined resistance $R_{HT}$ of the driven elements connected in parallel is as follows when resistance values of all the driven elements connected in parallel are the same and are $R_H$.

$$R_{HT} = \frac{R_H}{n} \tag{7}$$

Here, n is the number of driven elements for which the power supply is ON.

When a current of the constant current source is I, a power supply amount $W_{HT}$ for all the driven elements is as follows.

$$W_{HT} = \frac{V^2}{R_{HT}} = \frac{I^2 R'^2 R_{HT}}{(R_{HT} + R')^2} \tag{8}$$

Here, V is a value of a voltage applied to the driven element, and changes with a value of R' when the current I is constant.

In this case, the power supply amount $W_H$ for each of the driven elements is the same amount and is as follows.

$$W_H = \frac{W_{HT}}{n} = \frac{I^2 R'^2 R_{HT}}{n(R_{HT} + R')^2} \tag{9}$$

In this case, it is also possible to adjust the power supply amount for each of the driven elements by adjusting the resistance value of the resistor R'. Further, it is possible to adjust an amount of power given to an optical signal processing unit of a different chip with a common control unit or a common current generation unit by providing a resistor in a connection portion or a current generation unit in another embodiment. In addition, use of a variable resistor for the above-described resistor R' allows the connection portion or the current generation unit to be shared.

INDUSTRIAL APPLICABILITY

As described above, according to the present invention, it is possible to reduce the number of power driving elements in an optical signal processing device such as an optical switch or an optical filter realized by using optical waveguides. Because of the effect, mass productivity of the optical signal processing devices is improved, and contribution to a low cost of the devices is achieved through reduction of the number of parts.

The invention claimed is:

1. An optical signal processing device comprising:
a control unit,
one or a plurality of power driving elements,
a current generation unit,
a connection portion, and
an optical signal processing unit,
the optical signal processing unit includes an optical waveguide on a substrate, and
a plurality of phase shifters are driven in parallel with a single power voltage by the one or a plurality of power driving element,
wherein the optical signal processing unit is configured as an M×N optical switch and includes:
q multi-input N-output optical switches having a first type of MZIs, wherein the first type MZIs are not controlled in a push-pull driven manner; and
N q×1 switches having a second type of MZIs and being connected to each output port of the q multi-input N-output optical switches, wherein the second type of MZIs are controlled in a push-pull driven manner;
wherein the phase shifters are heaters disposed respectively on one arm of the first type of MZIs and on both arms of the second type of MZIs, and
wherein a resistance value of the heater disposed in the second type of MZI is twice a resistance value of the heater disposed in the first type of MZI, and
widths or lengths of the heaters differ between the first type of MZI and the second type of MZI in a chip of the optical waveguide.

2. The optical signal processing device according to claim 1,
wherein the single power voltage is supplied with one power driving element.

3. The optical signal processing device according to claim 1,
wherein each of the q multi-input N-output optical switches has the same structure.

4. The optical signal processing device according to claim 1,
wherein the single power voltage is supplied with a plurality of power driving elements.

5. The optical signal processing device according to claim 1,
wherein a total numbers of input ports of the q multi-input N-output optical switches is equal to M.

6. An optical signal processing device comprising:
a control unit,
one or a plurality of power driving elements,
a connection portion, and
an optical signal processing unit,
the optical signal processing unit includes an optical waveguide on a substrate, and
a plurality of phase shifters are driven in parallel with a single power voltage by the one or a plurality of power driving element,
wherein the optical signal processing unit is configured as a M×N optical switch and includes:
q M-input multi-output optical switches having a first type of MZIs, wherein the first type of MZIs are not controlled in a push-pull driven manner; and
M 1×q switches having a second type of MZIs and being connected to each input port of the q M-input multi-output optical switches, wherein the second type of MZIs are controlled in a push-pull driven manner;
wherein the phase shifters are heaters disposed respectively on one arm of the first type of MZIs and on both arms of the second type of MZIs,
wherein a resistance value of the heater disposed in the second type of MZI is twice a resistance value of the heater disposed in the first type of MZI; and
widths or lengths of the heaters differ between the first type of MZI and the second type of MZI in a chip of the optical waveguide.

7. The optical signal processing device according to claim 6,
wherein the single power voltage is supplied with one power driving element.

8. The optical signal processing device according to claim 6,
wherein each of the q M-input multi-output optical switches has the same structure.

9. The optical signal processing device according to claim 6,
wherein the single power voltage is supplied with a plurality of power driving elements.

10. The optical signal processing device according to claim 6,
wherein a total numbers of output ports of the q M-input multi-output optical switches is equal to N.

11. An optical signal processing device comprising:
a control unit,
one or a plurality of power driving elements,
a connection portion, and
an optical signal processing unit,
the optical signal processing unit includes an optical waveguide on a substrate, and
a plurality of phase shifters are driven in parallel with a single power voltage by the one or a plurality of power driving element,
wherein the optical signal processing unit is configured as a M×N MCSs and includes:
q multi-input N-output MCSs having a first type of MZIs, wherein the first type of MZIs are not controlled in a push-pull driven manner; and
N q×1 switches having a second type of MZIs and being connected to each output port of the multi-input N-output MCSs, wherein the second type of MZIs are controlled in a push-pull driven manner;
wherein the phase shifters are heaters disposed respectively on one arm of the first type of MZIs and on both arms of the second type of MZIs, wherein a resistance value of the heater disposed in the second type of MZI is twice a resistance value of the heater disposed in the first type of MZI; and widths or lengths of the heaters differ between the first type of MZI and the second type of MZI in a chip of the optical waveguide.

12. The optical signal processing device according to claim 11, wherein the single power voltage is supplied with one power driving element.

13. The optical signal processing device according to claim 11, wherein each of the q multi-input N-output MCSs has the same structure.

14. The optical signal processing device according to claim 11, wherein the single power voltage is supplied with a plurality of power driving elements.

15. The optical signal processing device according to claim 11, wherein a total numbers of input ports of the q multi-input N-output MCSs is equal to M.

* * * * *